US009133387B2

(12) United States Patent
Loiseau et al.

(10) Patent No.: US 9,133,387 B2
(45) Date of Patent: Sep. 15, 2015

(54) METHODS TO IMPROVE STABILITY OF HIGH SOLID CONTENT FLUID

(75) Inventors: Anthony Loiseau, Sugar Land, TX (US); Yiyan Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 408 days.

(21) Appl. No.: 13/153,507

(22) Filed: Jun. 6, 2011

(65) Prior Publication Data
US 2012/0305245 A1 Dec. 6, 2012

(51) Int. Cl.
*E21B 43/267* (2006.01)
*C09K 8/70* (2006.01)
*C09K 8/80* (2006.01)
*C09K 8/68* (2006.01)
*C09K 8/72* (2006.01)

(52) U.S. Cl.
CPC . *C09K 8/70* (2013.01); *C09K 8/685* (2013.01); *C09K 8/72* (2013.01); *C09K 8/80* (2013.01); *C09K 2208/08* (2013.01)

(58) Field of Classification Search
None
See application file for complete search history.

(56) References Cited

U.S. PATENT DOCUMENTS

| 2,193,775 | A |   | 3/1940  | Stratford |
|-----------|---|---|---------|-----------|
| 2,513,944 | A |   | 7/1950  | Kessler |
| RE24,570  | E |   | 11/1958 | Mangold et al. |
| 2,905,245 | A |   | 9/1959  | De Priester |
| 3,362,475 | A |   | 1/1968  | Hutt |
| 3,434,540 | A |   | 3/1969  | Stein |
| 3,675,717 | A |   | 7/1972  | Goins, Jr. |
| 3,868,999 | A | * | 3/1975  | Christopher et al. ......... 166/292 |
| 3,887,474 | A |   | 6/1975  | Senfe et al. |
| 3,937,283 | A |   | 2/1976  | Blauer et al. |
| 3,974,077 | A | * | 8/1976  | Free ............................. 507/211 |
| 4,051,900 | A | * | 10/1977 | Hankins .................... 166/280.2 |
| 4,387,769 | A |   | 6/1983  | Erbstoesser et al. |
| 4,506,734 | A |   | 3/1985  | Nolte |
| 4,526,695 | A |   | 7/1985  | Erbstoesser et al. |
| 4,606,407 | A |   | 8/1986  | Shu |
| 4,652,257 | A |   | 3/1987  | Chang |
| 4,665,988 | A |   | 5/1987  | Murphey et al. |
| 4,670,166 | A |   | 6/1987  | McDougall et al. |
| 4,718,490 | A |   | 1/1988  | Uhri |
| 4,738,897 | A |   | 4/1988  | McDougall et al. |

(Continued)

FOREIGN PATENT DOCUMENTS

| CA | 2710988 | 7/2009 |
|----|---------|--------|
| EP | 1236701 | 9/2002 |

(Continued)

OTHER PUBLICATIONS

Kirk-Othmer Encyclopedia of Chemical Technology, vol. 17, pp. 143-167 (1982), "Petroleum (Drilling Fluids)".

(Continued)

*Primary Examiner* — Angela M DiTrani
*Assistant Examiner* — Anuradha Ahuja
(74) *Attorney, Agent, or Firm* — Mathieu Vandermolen; Rachel Greene; Tim Curington

(57) ABSTRACT

A method of treating a subterranean formation of a well bore comprises providing a treatment fluid comprising a carrier fluid, a particulate material, a viscosifying agent and fumed silica, wherein fumed silica is in such concentration to reduce the settling rate of the particulate material in the treatment fluid; and introducing the treatment fluid into the wellbore.

30 Claims, 1 Drawing Sheet

(56) References Cited

U.S. PATENT DOCUMENTS

| | | |
|---|---|---|
| 4,785,884 A | 11/1988 | Armbruster |
| 4,848,467 A | 7/1989 | Cantu et al. |
| 4,867,241 A | 9/1989 | Strubhar |
| 4,883,124 A | 11/1989 | Jennings, Jr. |
| 4,917,185 A | 4/1990 | Jennings, Jr. et al. |
| 4,951,751 A | 8/1990 | Jennings, Jr. |
| 4,957,165 A | 9/1990 | Cantu et al. |
| 4,968,353 A | 11/1990 | Kawasaki et al. |
| 4,968,354 A | 11/1990 | Nishiura et al. |
| 4,977,961 A | 12/1990 | Avasthi |
| 4,986,355 A | 1/1991 | Casad et al. |
| 5,036,920 A | 8/1991 | Cornette et al. |
| 5,095,987 A | 3/1992 | Weaver et al. |
| 5,161,618 A | 11/1992 | Jones et al. |
| 5,188,837 A | 2/1993 | Domb |
| 5,238,067 A | 8/1993 | Jennings, Jr. |
| 5,325,921 A | 7/1994 | Johnson et al. |
| 5,330,005 A | 7/1994 | Card et al. |
| 5,332,037 A | 7/1994 | Schmidt et al. |
| 5,333,689 A | 8/1994 | Jones et al. |
| 5,415,228 A | 5/1995 | Price et al. |
| 5,439,055 A | 8/1995 | Card et al. |
| 5,492,178 A | 2/1996 | Nguyen et al. |
| 5,501,274 A | 3/1996 | Nguyen et al. |
| 5,501,275 A | 3/1996 | Card et al. |
| 5,507,342 A | 4/1996 | Copeland et al. |
| 5,518,996 A | 5/1996 | Maroy et al. |
| 5,551,516 A | 9/1996 | Norman et al. |
| 5,629,271 A | 5/1997 | Dobson, Jr. et al. |
| 5,713,416 A | 2/1998 | Chatterji et al. |
| 5,741,758 A | 4/1998 | Pakulski |
| 5,893,416 A | 4/1999 | Read |
| 5,908,073 A | 6/1999 | Nguyen et al. |
| 5,922,652 A | 7/1999 | Kowalski et al. |
| 5,934,376 A | 8/1999 | Nguyen et al. |
| 5,964,291 A | 10/1999 | Bourne et al. |
| 5,979,557 A | 11/1999 | Card et al. |
| 6,059,034 A | 5/2000 | Rickards et al. |
| 6,114,410 A | 9/2000 | Betzold |
| 6,156,805 A | 12/2000 | Smith et al. |
| 6,172,011 B1 | 1/2001 | Card et al. |
| 6,209,643 B1 | 4/2001 | Nguyen et al. |
| 6,209,646 B1 | 4/2001 | Reddy et al. |
| 6,239,183 B1 | 5/2001 | Farmer et al. |
| 6,258,859 B1 | 7/2001 | Dahayanake et al. |
| 6,279,656 B1 | 8/2001 | Sinclair et al. |
| 6,302,207 B1 | 10/2001 | Nguyen et al. |
| 6,326,335 B1 | 12/2001 | Kowalski et al. |
| 6,328,105 B1 | 12/2001 | Betzold |
| 6,330,916 B1 | 12/2001 | Rickards et al. |
| 6,364,020 B1 | 4/2002 | Crawshaw et al. |
| 6,379,865 B1 | 4/2002 | Mao et al. |
| 6,380,136 B1 | 4/2002 | Bates et al. |
| 6,435,277 B1 | 8/2002 | Qu et al. |
| 6,439,309 B1 | 8/2002 | Matherly et al. |
| 6,446,722 B2 | 9/2002 | Nguyen et al. |
| 6,464,009 B2 | 10/2002 | Bland et al. |
| 6,482,517 B1 | 11/2002 | Anderson |
| 6,506,710 B1 | 1/2003 | Hoey et al. |
| 6,543,538 B2 | 4/2003 | Tolman et al. |
| 6,559,245 B2 | 5/2003 | Mao et al. |
| 6,599,863 B1 | 7/2003 | Palmer et al. |
| 6,656,265 B1 | 12/2003 | Garnier et al. |
| 6,703,352 B2 | 3/2004 | Dahayanake et al. |
| 6,719,054 B2 | 4/2004 | Cheng et al. |
| 6,723,683 B2 | 4/2004 | Crossman et al. |
| 6,725,930 B2 | 4/2004 | Boney et al. |
| 6,742,590 B1 | 6/2004 | Nguyen |
| 6,776,235 B1 | 8/2004 | England |
| 6,818,594 B1 | 11/2004 | Freeman et al. |
| 6,828,280 B2 | 12/2004 | England et al. |
| 6,860,328 B2 | 3/2005 | Gonzalez et al. |
| 6,874,578 B1 | 4/2005 | Garnier et al. |
| 6,877,560 B2 | 4/2005 | Nguyen et al. |
| 6,938,693 B2 | 9/2005 | Boney et al. |
| 6,989,195 B2 | 1/2006 | Anderson |
| 7,004,255 B2 | 2/2006 | Boney |
| 7,028,775 B2 | 4/2006 | Fu et al. |
| 7,044,220 B2 | 5/2006 | Nguyen et al. |
| 7,044,224 B2 | 5/2006 | Nguyen |
| 7,049,272 B2 | 5/2006 | Sinclair et al. |
| 7,060,661 B2 | 6/2006 | Dobson, Sr. et al. |
| 7,066,260 B2 | 6/2006 | Sullivan et al. |
| 7,084,095 B2 | 8/2006 | Lee et al. |
| 7,148,185 B2 | 12/2006 | Fu et al. |
| 7,166,560 B2 | 1/2007 | Still et al. |
| 7,178,596 B2 | 2/2007 | Blauch et al. |
| 7,213,651 B2 | 5/2007 | Brannon et al. |
| 7,219,731 B2 | 5/2007 | Sullivan et al. |
| 7,237,610 B1 | 7/2007 | Saini et al. |
| 7,261,157 B2 | 8/2007 | Nguyen et al. |
| 7,265,079 B2 | 9/2007 | Willberg et al. |
| 7,267,170 B2 | 9/2007 | Mang et al. |
| 7,275,596 B2 | 10/2007 | Willberg et al. |
| 7,284,611 B2 | 10/2007 | Reddy et al. |
| 7,290,615 B2 | 11/2007 | Christanti et al. |
| 7,294,347 B2 | 11/2007 | Menjoge et al. |
| 7,303,018 B2 | 12/2007 | Cawiezel et al. |
| 7,345,012 B2 | 3/2008 | Chen et al. |
| 7,373,991 B2 | 5/2008 | Vaidya et al. |
| 7,398,826 B2 | 7/2008 | Hoefer et al. |
| 7,405,183 B2 | 7/2008 | Hanes, Jr. |
| 7,419,937 B2 | 9/2008 | Rimmer et al. |
| 7,451,812 B2 | 11/2008 | Cooper et al. |
| 7,482,310 B1 * | 1/2009 | Reese et al. .................. 507/225 |
| 7,482,311 B2 | 1/2009 | Willberg et al. |
| 7,493,955 B2 | 2/2009 | Gupta et al. |
| 7,510,009 B2 | 3/2009 | Cawiezel et al. |
| 7,528,096 B2 | 5/2009 | Brannon et al. |
| 7,543,640 B2 | 6/2009 | MacDougall |
| 7,559,369 B2 | 7/2009 | Roddy et al. |
| 7,565,929 B2 | 7/2009 | Bustos et al. |
| 7,581,590 B2 | 9/2009 | Lesko et al. |
| 7,624,802 B2 | 12/2009 | McCrary et al. |
| 7,644,761 B1 | 1/2010 | Gu et al. |
| 7,703,531 B2 | 4/2010 | Huang et al. |
| 7,784,541 B2 | 8/2010 | Hartman et al. |
| 7,789,146 B2 | 9/2010 | Panga et al. |
| 7,806,182 B2 | 10/2010 | Waters et al. |
| 7,833,947 B1 | 11/2010 | Kubala |
| 7,923,415 B2 | 4/2011 | Panga et al. |
| 7,931,088 B2 | 4/2011 | Stegemoeller et al. |
| 7,954,548 B2 | 6/2011 | Curimbaba et al. |
| 7,973,991 B2 | 7/2011 | Watanabe |
| 8,008,234 B2 | 8/2011 | Panga et al. |
| 8,119,574 B2 | 2/2012 | Panga et al. |
| 8,167,043 B2 | 5/2012 | Willberg et al. |
| 8,168,570 B2 | 5/2012 | Barron et al. |
| 8,210,249 B2 | 7/2012 | Panga et al. |
| 2003/0008779 A1 * | 1/2003 | Chen et al. .................. 507/200 |
| 2003/0134751 A1 | 7/2003 | Lee et al. |
| 2004/0060702 A1 | 4/2004 | Kotlar et al. |
| 2004/0074646 A1 | 4/2004 | Kotlar et al. |
| 2004/0106525 A1 | 4/2004 | Kotlar et al. |
| 2004/0152601 A1 | 8/2004 | Still et al. |
| 2004/0209780 A1 | 10/2004 | Harris et al. |
| 2004/0261993 A1 | 12/2004 | Nguyen |
| 2004/0261995 A1 | 12/2004 | Nguyen et al. |
| 2004/0261996 A1 | 12/2004 | Munoz, Jr. et al. |
| 2005/0000690 A1 * | 1/2005 | Boney .................. 166/280.2 |
| 2005/0027499 A1 | 2/2005 | Bourbiaux et al. |
| 2005/0103496 A1 | 5/2005 | Todd et al. |
| 2005/0130845 A1 | 6/2005 | Freeman et al. |
| 2005/0130848 A1 | 6/2005 | Todd et al. |
| 2005/0161220 A1 | 7/2005 | Todd et al. |
| 2005/0172699 A1 | 8/2005 | Hu et al. |
| 2005/0233895 A1 | 10/2005 | Mertens et al. |
| 2005/0252651 A1 | 11/2005 | Bosma et al. |
| 2005/0252659 A1 | 11/2005 | Sullivan et al. |
| 2006/0006539 A1 | 1/2006 | Matsui et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0054324 A1 | 3/2006 | Sullivan et al. |

(56) References Cited

U.S. PATENT DOCUMENTS

| | | |
|---|---|---|
| 2006/0058197 A1 | 3/2006 | Brown et al. |
| 2006/0073980 A1 | 4/2006 | Brannon et al. |
| 2006/0113078 A1 | 6/2006 | Nguyen et al. |
| 2006/0124302 A1 | 6/2006 | Gupta et al. |
| 2006/0151173 A1 | 7/2006 | Slabaugh et al. |
| 2006/0157243 A1 | 7/2006 | Nguyen |
| 2006/0175059 A1 | 8/2006 | Sinclair et al. |
| 2006/0185848 A1 | 8/2006 | Surjaatmadja et al. |
| 2006/0289160 A1 | 12/2006 | van Batenburg et al. |
| 2007/0017675 A1 | 1/2007 | Hammami et al. |
| 2007/0029086 A1 | 2/2007 | East, Jr. |
| 2007/0039733 A1 | 2/2007 | Welton et al. |
| 2007/0042912 A1 | 2/2007 | Welton et al. |
| 2007/0044963 A1 | 3/2007 | MacDougall |
| 2007/0161515 A1* | 7/2007 | Bicerano ............. 507/117 |
| 2007/0181302 A1* | 8/2007 | Bicerano ............. 166/280.2 |
| 2007/0238623 A1 | 10/2007 | Saini et al. |
| 2008/0000391 A1 | 1/2008 | Drochon |
| 2008/0000638 A1 | 1/2008 | Burukhin et al. |
| 2008/0053657 A1 | 3/2008 | Alary et al. |
| 2008/0066910 A1 | 3/2008 | Alary et al. |
| 2008/0093073 A1 | 4/2008 | Bustos et al. |
| 2008/0103065 A1 | 5/2008 | Reddy et al. |
| 2008/0108520 A1* | 5/2008 | Fu et al. ............. 507/204 |
| 2008/0121395 A1 | 5/2008 | Reddy et al. |
| 2008/0135242 A1* | 6/2008 | Lesko et al. ............. 166/268 |
| 2008/0135250 A1 | 6/2008 | Bosma et al. |
| 2008/0210423 A1 | 9/2008 | Boney |
| 2008/0280788 A1 | 11/2008 | Parris et al. |
| 2008/0280790 A1 | 11/2008 | Mirakyan et al. |
| 2008/0314594 A1 | 12/2008 | Still et al. |
| 2008/0318026 A1 | 12/2008 | Dai et al. |
| 2009/0008095 A1 | 1/2009 | Duncum et al. |
| 2009/0025394 A1 | 1/2009 | Bonzani et al. |
| 2009/0025932 A1 | 1/2009 | Panga et al. |
| 2009/0025934 A1* | 1/2009 | Hartman et al. ............. 166/280.2 |
| 2009/0107671 A1 | 4/2009 | Waters et al. |
| 2009/0111718 A1* | 4/2009 | Gadiyar et al. ............. 507/269 |
| 2009/0194288 A1* | 8/2009 | Walters et al. ............. 166/308.3 |
| 2009/0294126 A1 | 12/2009 | Dalrymple et al. |
| 2010/0000735 A1 | 1/2010 | Weaver et al. |
| 2010/0004146 A1 | 1/2010 | Panga et al. |
| 2010/0006293 A1* | 1/2010 | Gu et al. ............. 166/308.2 |
| 2010/0087341 A1 | 4/2010 | Alary et al. |
| 2010/0087342 A1 | 4/2010 | Alary et al. |
| 2010/0089580 A1 | 4/2010 | Brannon et al. |
| 2010/0126722 A1 | 5/2010 | Cornelissen et al. |
| 2010/0163225 A1 | 7/2010 | Abad et al. |
| 2010/0175878 A1* | 7/2010 | Rispler et al. ............. 166/280.1 |
| 2010/0200247 A1 | 8/2010 | Dybevik et al. |
| 2010/0252259 A1 | 10/2010 | Horton |
| 2010/0300688 A1 | 12/2010 | Panga et al. |
| 2010/0307752 A1* | 12/2010 | Rey et al. ............. 166/305.1 |
| 2011/0005760 A1 | 1/2011 | Hartman et al. |
| 2011/0036577 A1 | 2/2011 | Barmatov et al. |
| 2011/0053813 A1 | 3/2011 | Panga et al. |
| 2011/0083849 A1 | 4/2011 | Medvedev et al. |
| 2011/0098202 A1 | 4/2011 | James et al. |
| 2011/0155371 A1 | 6/2011 | Panga et al. |
| 2011/0155372 A1 | 6/2011 | Panga et al. |
| 2011/0198089 A1 | 8/2011 | Panga et al. |
| 2011/0247812 A1 | 10/2011 | Panga et al. |
| 2011/0312857 A1 | 12/2011 | Amanullah et al. |
| 2012/0000641 A1 | 1/2012 | Panga et al. |
| 2012/0000651 A1 | 1/2012 | Panga et al. |
| 2012/0000653 A1 | 1/2012 | Panga et al. |
| 2012/0125617 A1 | 5/2012 | Gu et al. |
| 2012/0132421 A1 | 5/2012 | Loiseau et al. |
| 2012/0138296 A1 | 6/2012 | Panga et al. |
| 2012/0190598 A1 | 7/2012 | McCubbins, Jr. et al. |
| 2012/0247764 A1 | 10/2012 | Chen et al. |
| 2012/0285694 A1 | 11/2012 | Morvan et al. |
| 2012/0305254 A1 | 12/2012 | Chen et al. |
| 2013/0319667 A1 | 12/2013 | Chen |

FOREIGN PATENT DOCUMENTS

| | | |
|---|---|---|
| GB | 2277543 | 11/1994 |
| RU | 2065442 | 8/1996 |
| RU | 2221130 | 1/2004 |
| RU | 2376451 | 12/2009 |
| RU | 2404359 | 11/2010 |
| RU | 2413064 | 2/2011 |
| RU | 2417243 | 4/2011 |
| WO | WO9607710 | 3/1996 |
| WO | WO9930249 | 6/1999 |
| WO | WO2004007904 | 1/2004 |
| WO | WO2004038176 | 5/2004 |
| WO | 2006082359 | 8/2006 |
| WO | WO2009013710 | 1/2009 |
| WO | 2009088317 | 7/2009 |
| WO | WO2009106796 | 9/2009 |
| WO | WO2009141749 | 11/2009 |
| WO | WO2010117547 | 10/2010 |
| WO | WO2011024100 | 3/2011 |
| WO | WO2011129937 | 10/2011 |
| WO | WO2011143055 | 11/2011 |
| WO | WO2012001574 | 1/2012 |

OTHER PUBLICATIONS

Kirk-Othmer Encyclopedia of Chemical Technology, vol. 7, pp. 297-299 (1965).

SPE 131783—Less Sand May Not be Enough, M. Curry, T. Maloney, R Woodroff, and R. Leonard, Feb. 23-15, 2010, SPR Unconventional Gas Conference, Pittsburg, PA, USA.

ARMA/USRMS 05-780—Experiments and numerical simulation of hydraulic fracturing in naturally fractured rock, C.J. De Pater and L.J.L. Beugelsdijk, Jun. 25-29, 2010, The 40th U.S. Symposium of Rock Mechanics (USRMS), Anchorage, AK, USA.

Nolte, K.G.: "Application of Fracture Design Based on Pressure Analysis," SPE13393—SPE Production Engineering, vol. 3, No. 1, 31-42, Feb. 1988.

Nolte, K.G. and Smith, M.B.: "Interpretation of Fracturing Pressures,"—SPE8297—JPT, vol. 12, No. 8, pp. 1767-1775, Sep. 1981.

Smith, M.B., Miller II, W.K., and Haga, J.: "Tip Screenout Fracturing: A Technique for Soft, Unstable Formations," SPE13273—SPE Production Engineering, vol. 2, No. 2, 95-103, May 1987.

Asgian, M.I., Cundall, P.A., and Brady, B.H. (1995) "Mechanical Stability of Porpped Hydraulic Fractures: A Numerical Study",—SPE28510—JPT, 203-208, Mar. 1995.

Milton-Tayler, D., Stephenson, C., and Asgian, M. (1992) "Factors Affecting the Stability of Proppant in Propped Fractures: Results of a Laboratory Study," paper SPE 24821 presented at the SPE Annual Technical Conference and Exhibition, Washington, DC, Oct. 4-7.

Desroches, J., et al. (1994) The Crack Tip Region in Hydraulic Fracturing. Proc. R. Soc. Lond. A, 447: p. 39-48.

Schlumberger CemCRETE Brochure (2003).

Schlumberger Cementing Services and Products—Materials, pp. 39-76 (2012).

SPE 119366—Fracture Design Considerations in Horizontal Wells Drilled in Unconventional Gas Reservoirs; Cipolla, C.L., Lolon, E.P., Mayerhofer, M.J., and Warpinski, N.R. (2009).

Economides M.J. and Nolte K.G., Reservoir Stimulation, John Wiley and Sons, Ltd, 3rd Edition New York, 2000—Chapter 10, "Fracture Treatment Design" by Jack Elbel and Larry Britt, (pp. 10-1 to 10-50).

Economides M.J. and Nolte K.G., Reservoir Stimulation, John Wiley and Sons, Ltd, 3rd Edition New York, 2000—Chapter 8, "Performance of Fracturing Materials" by V.G Constien et al., (pp. 8-1 to 8-26).

Economides M.J. and Nolte K.G., Reservoir Stimulation, John Wiley and Sons, Ltd, 3rd Edition New York, 2000—Chapter 5, "Basics of Hydraulic Fracturing" By M.B.Smith and J.W. Shlyapobersky, (pp. 5-1 to 5-28).

(56) References Cited

OTHER PUBLICATIONS

Economides M.J. and Nolte K.G., Reservoir Stimulation, John Wiley and Sons, Ltd, 3rd Edition New York, 2000—Chapter 7, "Fracturing Fluid Chemistry and Proppants" by Janet Gulbis and Richard M.Hogde, (pp. 7-1 to 7-23).

Aveyard et al; "Emulsions stabilised solely by colloidal particles"; Advances in Colloid and Interface Science 100-102 pp. 503-546 (2003).

Binks et al; "Pickering emulsions stabilized by monodisperse latex particles: Effects of particle size"; Langmuir vol:17 iss:15 p. 4540-4547 (2001).

Montagne etal; "Highly magnetic latexes from submicrometer oil in water ferrofluid emulsions"; Journal of polymer science. Part A, Polymer chemistry vol:44 iss:8 p. 2642-2656 (2006).

Park et al; "Rheological Properties and Stabilization of Magnetorheological Fluids in a Water-in-Oil Emulsion"; Journal of Colloid and Interface Science 240, 349-354 (2001).

Pickering, SU; "Emulsions" Journal of the Chemical Society vol. 91 pp. 2001-2021 (1907).

Desroches, et al., "On the Modelling of Near Tip Processes in Hydraulic Fractures", International Journal of Rock Mechanics and Mining Sciences & Geomechanics Abstracts, vol. 30, No. 7, 1993, pp. 1127-1134.

* cited by examiner

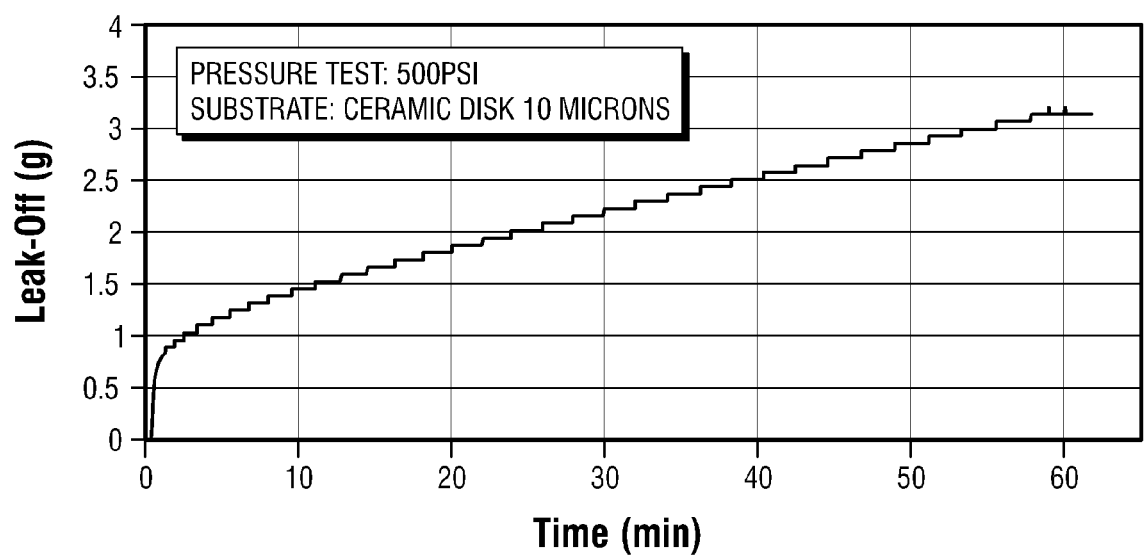

METHODS TO IMPROVE STABILITY OF HIGH SOLID CONTENT FLUID

FIELD OF THE INVENTION

The invention relates to methods for treating subterranean formations. More particularly, the invention relates to methods for improving the stability of high solid content fluid.

BACKGROUND

The statements in this section merely provide background information related to the present disclosure and may not constitute prior art.

Hydrocarbons (oil, condensate, and gas) are typically produced from wells that are drilled into the formations containing them. For a variety of reasons, such as inherently low permeability of the reservoirs or damage to the formation caused by drilling and completion of the well, the flow of hydrocarbons into the well is undesirably low. In this case, the well is "stimulated" for example using hydraulic fracturing, chemical (usually acid) stimulation, or a combination of the two (called acid fracturing or fracture acidizing).

In hydraulic and acid fracturing, a first viscous fluid called the pad is typically injected into the formation to initiate and propagate the fracture. This is followed by a second fluid that contains a proppant to keep the fracture open after the pumping pressure is released. Granular proppant materials may include sand, ceramic beads, or other materials. In "acid" fracturing, the second fluid contains an acid or other chemical such as a chelating agent that can dissolve part of the rock, causing irregular etching of the fracture face and removal of some of the mineral matter, resulting in the fracture not completely closing when the pumping is stopped. Several types of viscosifiers are used to increase the viscosity of the fluid. These include polymers such as HEC, Xanthan, Guar etc and viscoelastic surfactants. Occasionally, hydraulic fracturing can be done without a highly viscosified fluid (i.e., slick water) to minimize the damage caused by polymers or the cost of other viscosifiers.

In gravel packing, gravel is placed in the annulus of screen and formation/casing to control sand production. A carrier fluid is used to transport gravel from the surface to the formation where the gravel has to be placed. Typically two types of carrier fluids are used. The first is a brine with a low concentration of gravel (1 lb per gal of brine) and the second is a viscous fluid with high concentration of gravel (5 lb per gal of brine). Several types of viscosifiers are used to increase the viscosity of the fluid. These include polymers such as HEC, Xanthan, Guar etc and viscoelastic surfactants.

The transport of solids (proppant, gravel, or other particulate or solid material) from the surface to the required depth in the well plays an important role in well stimulations. A common problem that occurs during solids transport is the settling of solids due to difference in densities of the fluid and the solid particles. If the solids start settling before the fluid reaches its destination, several problems can occur including screen outs, incomplete gravel packs, wellbore blockage, stuck tools etc. To reduce the settling rate, the carrier fluid is typically viscosified using polymers or surfactants. However, increasing the viscosity of the fluid at the surface can increase the friction pressure significantly.

Methods disclosed herewith offer a new way to ensure the stability of the high solid content fluid while it is under downhole conditions.

SUMMARY

According to some embodiments, the method comprises providing a treatment fluid comprising a carrier fluid, a particulate material, a viscosifying agent and fumed silica, wherein fumed silica is in such concentration to reduce the settling rate of the particulate material in the treatment fluid; and introducing the treatment fluid into the wellbore.

BRIEF DESCRIPTION OF THE DRAWINGS

FIG. 1 is a graph showing the leak-off as function of time for sample D according to one embodiment.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments and should not be construed as a limitation to the scope. While the compositions are described herein as comprising certain materials, it should be understood that the composition could optionally comprise two or more chemically different materials. In addition, the composition can also comprise some components other than the ones already cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing methods otherwise use conventional techniques known in the art.

The treatment fluid includes a carrier fluid, at least a particulate material, a viscosifying agent and fumed silica, wherein fumed silica is in such concentration to reduce the settling rate of the particulate material in the treatment fluid.

According to one embodiment, the treatment fluid is used as a fracturing fluid. The carrier fluid includes any base fracturing fluid understood in the art. Some non-limiting examples of carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine. The carrier fluid may be water, DI water, tap water, seawater, produced water or any type of water available in the field.

The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers effective as viscosifying agent include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

Cellulose derivatives are used to a smaller extent, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent particulate-suspension ability even though they are more expensive than guar derivatives and therefore have been used less frequently, unless they can be used at lower concentrations.

In other embodiments, the viscosifying agent is made from a crosslinkable, hydratable polymer and a delayed crosslinking agent, wherein the crosslinking agent comprises a complex comprising a metal and a first ligand selected from the group consisting of amino acids, phosphono acids, and salts or derivatives thereof. Also the crosslinked polymer can be made from a polymer comprising pendant ionic moieties, a surfactant comprising oppositely charged moieties, a clay stabilizer, a borate source, and a metal crosslinker. Said embodiments are described in U.S. Patent Publications US2008-0280790 and US2008-0280788 respectively, each of which are incorporated herein by reference.

The viscosifying agent may be a viscoelastic surfactant (VES). The VES may be selected from the group consisting of cationic, anionic, zwitterionic, amphoteric, nonionic and combinations thereof. Some non-limiting examples are those cited in U.S. Pat. No. 6,435,277 (Qu et al.) and U.S. Pat. No. 6,703,352 (Dahayanake et al.), each of which are incorporated herein by reference. The viscoelastic surfactants, when used alone or in combination, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

In general, particularly suitable zwitterionic surfactants have the formula:

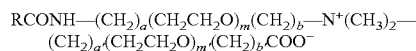

in which R is an alkyl group that contains from about 11 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and $CH_2CH_2O$ may also be $OCH_2CH_2$. In some embodiments, a zwitterionic surfactants of the family of betaine is used.

Exemplary cationic viscoelastic surfactants include the amine salts and quaternary amine salts disclosed in U.S. Pat. Nos. 5,979,557, and 6,435,277 which are hereby incorporated by reference. Examples of suitable cationic viscoelastic surfactants include cationic surfactants having the structure:

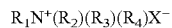

in which $R_1$ has from about 14 to about 26 carbon atoms and may be branched or straight chained, aromatic, saturated or unsaturated, and may contain a carbonyl, an amide, a retroamide, an imide, an urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Amphoteric viscoelastic surfactants are also suitable. Exemplary amphoteric viscoelastic surfactant systems include those described in U.S. Pat. No. 6,703,352, for example amine oxides. Other exemplary viscoelastic surfactant systems include those described in U.S. Pat. Nos. 6,239,183; 6,506,710; 7,060,661; 7,303,018; and 7,510,009 for example amidoamine oxides. These references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Alkyl sarcosinates can have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

$R_1CON(R_2)CH_2X$ wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

The viscosifying agent may be present in lower amount than conventionally is included for a fracture treatment. The loading of a viscosifier, for example described in pounds of gel per 1,000 gallons of carrier fluid, is selected according to the particulate size (due to settling rate effects) and loading that the storable composition 106 must carry, according to the viscosity required to generate a desired fracture geometry, according to the pumping rate and casing or tubing configuration of the wellbore, according to the temperature of the formation of interest, and according to other factors understood in the art.

In certain embodiments, the low amount of a viscosifying agent includes a hydratable gelling agent in the carrier fluid at less than 20 pounds per 1,000 gallons of carrier fluid where the amount of particulates in the storable composition 106 are greater than 16 pounds per gallon of carrier fluid. In certain further embodiments, the low amount of a viscosifier includes a hydratable gelling agent in the carrier fluid at less than 20 pounds per 1,000 gallons of carrier fluid where the amount of particulates in the fracturing slurry 106 are greater than 23 pounds per gallon of carrier fluid. In certain embodiments, a low amount of a viscosifier includes a viscoelastic surfactant at a concentration below 1% by volume of carrier fluid. In certain embodiments, the low amount of a viscosifier includes the carrier fluid with no viscosifier included. In certain embodiments a low amount of a viscosifier includes values greater than the listed examples, because the circumstances of the storable composition conventionally utilize viscosifier amounts much greater than the examples. For example, in a high temperature application with a high proppant loading, the carrier fluid may conventionally indicate a viscosifier at 50 lbs. of gelling agent per 1,000 gallons of carrier fluid, wherein 40 lbs. of gelling agent, for example, may be a low amount of viscosifier. One of skill in the art can perform routine tests of storable composition based on certain particulate blends in light of the disclosures herein to determine acceptable viscosifier amounts for a particular embodiment.

In certain embodiments, the carrier fluid includes an acid. The fracture may be a traditional hydraulic bi-wing fracture, but in certain embodiments may be an etched fracture and/or wormholes such as developed by an acid treatment. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. The selection of any acid as a carrier fluid depends upon the purpose of the acid—for example formation etching, damage cleanup, removal of acid-reactive particles, etc., and further upon compatibility with the formation, compatibility with fluids in the formation, and compatibility with other components of the fracturing slurry and with spacer fluids or other fluids that may be present in the wellbore. The selection of an acid for the carrier fluid is understood in the art based upon the characteristics of particular embodiments and the disclosures herein.

The treatment fluid includes a particulate material. In one embodiment, the particulate material is a blend made of proppant. Proppant selection involves many compromises imposed by economical and practical considerations. Criteria for selecting the proppant type, size, size distribution in multimodal proppant selection, and concentration is based on the needed dimensionless conductivity, and can be selected by a skilled artisan. Such proppants can be natural or synthetic (including but not limited to glass beads, ceramic beads, sand, and bauxite), coated, or contain chemicals; more than one can be used sequentially or in mixtures of different sizes or different materials. The proppant may be resin coated (curable), or pre-cured resin coated. Proppants and gravels in the same or different wells or treatments can be the same material and/or the same size as one another and the term proppant is intended to include gravel in this disclosure. In some embodiments, irregular shaped particles may be used. International application WO 2009/088317 discloses a method of fracturing with a slurry of proppant containing from 1 to 100 percent of stiff, low elasticity, low deformability elongated particles. US patent application 2007/768393 discloses proppant that is in the form of generally rigid, elastic plate-like particles having a maximum to minimum dimension ratio of more than about 5, the proppant being at least one of formed from a corrosion resistant material or having a corrosion resistant material formed thereon. In general the proppant used will have an average particle size of from about 0.15 mm to about 4.76 mm (about 100 to about 4 U.S. mesh), preferably from about 0.15 mm to about 3.36 mm (about 100 to about 6 U.S. mesh), more preferably from about 0.15 mm to about 4.76 mm (about 100 to about 4 U.S. mesh), more particularly, but not limited to 0.25 to 0.42 mm (40/60 mesh), 0.42 to 0.84 mm (20/40 mesh), 0.84 to 1.19 mm (16/20 mesh), 0.84 to 1.68 mm (12/20 mesh) and 0.84 to 2.38 mm (8/20 mesh) sized materials. Normally the proppant will be present in the slurry in a concentration from about 0.12 to about 0.96 kg/L, or from about 0.12 to about 0.72 kg/L, or from about 0.12 to about 0.54 kg/L. Also, there are slurries where the proppant is at a concentration up to 16 PPA (1.92 kg/L). If the slurry is foamed the proppant is at a concentration up to 20 PPA (2.4 kg/L). The storable composition is not a cement slurry composition.

The treatment fluid is a slurry comprising particulate materials with defined particles size distribution. One example of realization is disclosed in U.S. Pat. No. 7,784,541, herewith incorporated by reference in its entirety. In certain embodiments, the selection of the size for the first amount of particulates, e.g., between about 100 and 2000 µm, is dependent upon the characteristics of the propped fracture, for example the closure stress of the fracture, the desired conductivity, the size of fines or sand that may migrate from the formation, and other considerations understood in the art. In certain further embodiments, the selection of the size for the first amount of particulates is dependent upon the desired fluid loss characteristics of the first amount of particulates as a fluid loss agent, the size of pores in the formation, and/or the commercially available sizes of particulates of the type comprising the first amount of particulates.

In certain embodiments, the selection of the size of the second amount of particulates is dependent upon maximizing or optimizing a packed volume fraction (PVF) of the mixture of the first amount of particulates and the second amount of particulates. The packed volume fraction or packing volume fraction (PVF) is the fraction of solid content volume to the total volume content. A second average particle size of between about seven to ten times smaller than the first amount of particulates contributes to maximizing the PVF of the mixture, but a size between about three to twenty times smaller, and in certain embodiments between about three to fifteen times smaller, and in certain embodiments between about three to ten times smaller will provide a sufficient PVF for most slurry. Further, the selection of the size of the second amount of particulates is dependent upon the composition and commercial availability of particulates of the type comprising the second amount of particulates. In certain embodiments, the particulates combine to have a PVF above 0.70, 074 or 0.75 or above 0.80. In certain further embodiments the particulates may have a much higher PVF approaching 0.95. The optimization of the particles sizes distribution (Apollonian distribution), and dispersion of particles with high surface area lead to make fluids with high solid content (solid volume fraction from 50 to 70%).

The slurry may further include a third amount of particulates having a third average particle size that is smaller than the second average particle size. In certain further embodiments, the slurry may have a fourth, a fifth or a sixth amount of particles. Also in some embodiments, the same chemistry can be used for the third, fourth, fifth or sixth average particle size. Also in some embodiments, different chemistry can be used for the same third average particle size: e.g. in the third average particle size, half of the amount is a certain type of proppant and the other half is another type of proppant. For the purposes of enhancing the PVF of the slurry, more than three or four particles sizes will not typically be required. However, additional particles may be added for other reasons, such as the chemical composition of the additional particles, the ease of manufacturing certain materials into the same particles versus into separate particles, the commercial availability of particles having certain properties, and other reasons understood in the art.

The treatment fluid comprises fumed silica. Fumed silica also known as pyrogenic silica consists of microscopic droplets of amorphous silica fused into branched, chainlike, three-dimensional secondary particles which then agglomerate into tertiary particles. The resulting powder has an extremely low bulk density and high surface area. The fumed silica is present in the treatment fluid in a concentration to reduce the settling rate of the particulate material in the treatment fluid. The concentration is less than about 2% by weight of the treatment fluid. In further embodiment, the concentration is less than about 1% by weight of the treatment fluid. In further embodiment, the concentration is less than about 0.6% by weight of the treatment fluid. In further embodiment, the concentration is in the range of about 0.001% to about 0.5% by weight of the treatment fluid. In further embodiment, the concentration is in the range of about 0.1% to about 0.5% by weight of the treatment fluid. Fumed silica particles are compatible with current common additives: leak-off control additives (latex, nanoparticles, viscosifier . . . ) and antifoam, dispersant, surfactant.

According to a further embodiment, the treatment fluid further comprises a degradable material. In certain embodiments, the degradable material includes at least one of a lactide, a glycolide, an aliphatic polyester, a poly(lactide), a poly(glycolide), a poly($\epsilon$-caprolactone), a poly(orthoester), a poly(hydroxybutyrate), an aliphatic polycarbonate, a poly (phosphazene), and a poly(anhydride). In certain embodiments, the degradable material includes at least one of a poly(saccharide), dextran, cellulose, chitin, chitosan, a protein, a poly(amino acid), a poly(ethylene oxide), and a copolymer including poly(lactic acid) and poly(glycolic acid). In certain embodiments, the degradable material includes a copolymer including a first moiety which includes at least one functional group from a hydroxyl group, a carboxylic acid group, and a hydrocarboxylic acid group, the copolymer further including a second moiety comprising at least one of glycolic acid and lactic acid.

In an embodiment, the degradable material is selected from substituted and unsubstituted lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures of such materials. Preferred examples are polyglycolic acid or PGA, and polylactic acid or PLA. These materials function as solid-acid precursors, and upon dissolution in the fracture, can form acid species which can have secondary functions in the fracture as for example clean-up of the unwanted particulate material or treatment fluid additives.

In some embodiments, the treatment fluid can be made to be partially degradable when particles other than proppant are degradable i.e. they could disappear after a certain amount of time (following different processes: thermal degradation, thermal decomposition, dissolution etc.). Degradation of particles leads to increase the permeability of the proppant pack. Degradation should take place after placement. Several kind of degradable particles can be used, mineral (salt . . . ) or organic (PLA, PGA, wax . . . ) or any combination of them.

In some embodiments, the treatment fluid can comprise fiber. A first type of fiber additive can provide reinforcement and consolidation of the proppant. This fiber type can include, for example, glass, ceramics, carbon and carbon-based compounds, metals and metallic alloys, and the like and combinations thereof, as a material that is packed in the proppant to strengthen the proppant pillars. And in other applications, a second type of fiber can be used that inhibits settling of the proppant in the treatment fluid. The second fiber type can include, for example, polylactic acid, polyglycolic acid, polyethylterephthalate (PET), polyol, and the like and combinations thereof, as a material that inhibits settling or dispersion of the proppant in the treatment fluid and serves as a primary removable fill material in the spaces between the pillars. Yet other applications include a mixture of the first and second fiber types, the first fiber type providing reinforcement and consolidation of the proppant and the second fiber type inhibiting settling of the proppant in the treatment fluid.

The fibers can be hydrophilic or hydrophobic in nature. Hydrophilic fibers are preferred in one embodiment. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like.

In some embodiments, the treatment fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the first or second treatment fluid using a gas, such as air, nitrogen, or carbon dioxide.

The treatment fluids may be used for carrying out a variety of subterranean treatments, including, but not limited to, drilling operations, fracturing treatments, and completion operations (e.g., gravel packing) In some embodiments, the treatment fluids may be used in treating a portion of a subterranean formation. In certain embodiments, a treatment fluid may be introduced into a well bore that penetrates the subterranean formation. Optionally, the treatment fluid further may comprise particulates and other additives suitable for treating the subterranean formation. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore. In certain embodiments, the treatment fluids may be used in fracturing treatments.

The method is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of in hydraulic fracturing or gravel in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

In certain embodiments, the treatment fluids may be used for providing some degree of sand control in a portion of the subterranean formation. In the sand control embodiments, the treatment fluid is introduced into the well bore that penetrates the subterranean formation such that the particulates form a gravel pack in or adjacent to a portion of the subterranean formation.

To facilitate a better understanding, the following example of embodiments is given. In no way should the following example be read to limit, or define, the scope.

EXAMPLES

A series of experiments were conducted to demonstrate method of treatment according to the invention.

Fumed silica is used to reduce significantly the amount of mineral such as calcium carbonates, or organic polymer currently used to maintain the stability of high solid content fluids. Experimental results have shown that a very low concentration of fumed silica is sufficient for making high solid content fluids stable, with adapted fluid properties such as leak-off control, and rheology behavior. On the other hand, the drastic reduction of $CaCO_3$ concentration and the very small amount of fumed silica increase the efficiency of any clean-up phase. To make the fluid several options could be envisaged, either with hydrophilic fumed silica or hydrophobic or even fumed silica stabilized in solution with this last option the well site delivery become much easier.

Previous high solid content fluid formulations have shown that a large amount of suspending agent such as calcium carbonate is needed to prevent settling of proppant. In forgoing embodiments, a very low concentration of fumed silica is sufficient to make fluid stable (less than 2 wt %). The $CaCO_3$ concentration has been reduced by almost one order of magnitude (Table 1, Samples A and B are systems with $CaCO_3$ as suspending agent, in Samples C and D fumed silica is the suspending agent). Table 1 below shows examples of formulations of samples according to the embodiments (C and D) and of prior art (A and B).

TABLE 1

| fluid | unit | Sample A | Sample B | Sample C | Sample D |
|---|---|---|---|---|---|
| Total fluid volume (ml) | | 100 | 100 | 100 | 100 |
| Proppant | g | 103.5 | 93.4 | 101.1 | 101.10 |
| $CaCO_3$ | g | 16.3 | 16.2 | 2.95 | 5.9 |
| Fumed Silica (Aerosil 200) | g | 0 | 0 | 0.80 | 0.80 |
| PLA particles | g | 18.75 | 23.1 | 19.08 | 17.72 |
| Surfactant | g | 0 | 0.6 | 0.33 | 0.33 |
| Dispersant | g | 0.14 | 0.19 | 0.44 | 0.44 |
| Latex | g | 19.78 | 19.76 | 22.25 | 22.25 |
| Viscosifier | g | 0.78 | 0.78 | 0.87 | 0.87 |
| Antifoam | g | 0.4 | 0.39 | 0.22 | 0.22 |
| Tap water | g | 19.38 | 19.37 | 21.81 | 21.81 |
| Free fluid | | no | No | Little | no |
| Settling after 24 h | | no | No | no | no |

When $CaCO_3$ is used as suspending agent a large amount of this material is needed to provide sufficient yield stress to suspend the proppant and make the system stable (no settling) over a long period of time (days). In the current embodiment (example formulation of Samples C and D, Table 1), $CaCO_3$ is added just as a leak off control additive. Its role is only to increase the particle pack efficiency following the PVF optimization (Apollonian rule) and improve the latex film efficiency against the leak off. Thus, high solid content fluid properties are not affected by the use of fumed silica; (FIG. 1) leak off control is still very good (around 2 g in 30 min on 10 micron substrate) and much better than conventional hydraulic fracturing fluids based for instance on guar (usually a few thousands of mL in the high permeability substrate as in the high solid content fluid test). The high solid content fluid form a layer of low permeability wall during the leakoff process, its permeability, denoted as Cw in fracturing fluid leakoff properties, is a fraction of that of a polymer fluid. Moreover, plastic viscosity stays in a range allowing the pumpability of this fluid downhole with current field equipments (Table 2). Yield stress, which is the main parameter governing the solid suspension in this fluid, remains high even without the large quantity of $CaCO_3$. Fluids formulated with fumed silica are stable within a large range of temperature (from 50 to 180 deg F.–10 deg C. to 82 deg C.). Systems F and G have been placed into an oven at 180 deg F. (82 deg C.) for about 72 hours. Both samples did not show any settling. Table 2 below shows the fluid properties of samples formulated in Table 1.

TABLE 2

| Formulation | | Sample A | Sample B | Sample C | Sample D |
|---|---|---|---|---|---|
| Plastic viscosity | cP | 1224 | 670 | 241 | 470 |
| Yield Stress | Pa | 20 | 13.5 | 19.4 | 20 |
| Leak off (500 psi, 30 min) | g | 2.18 | 2.05 | 2.39 | 2.13 |

After placement, hydraulic fracturing fluids should be cleaned up to increase the permeability of the proppant pack and allow the production of oil. In high solid content fluid formulations, the cleanup can be achieved by including solid acid precursor, such as PLA, to decompose and generate acid in situ as explained above. The acid generated will be used to react with the $CaCO_3$ in the formulation. When $CaCO_3$ is used as suspending agent, a large amount of acid is needed to dissolve it, due to its high concentration. Current embodiments are easier to clean because less calcium carbonate is used, thus less acid is required to dissolve this component. If we consider the worst case where calcium carbonate is not totally dissolved, due to its low concentration in the system only low damages are expected.

Finally, fumed silica particles are very small (less than one micron) and at low concentration, so they can easily flow through the proppant pack and back to surface and give a good cleanup.

Table 3 below summarizes different types of fumed silica used. Different kind of fumed silica can be used to achieve a good fluid stability either hydrophilic such as Aerosil 200, or hydrophobic such Aerosil R974, or even fumed silica in stabilized solution such Aerodisp W7520. Fumed silica already dispersed and stabilized in water solution presents the advantage to be easily handled, delivered and mixed on location. This will improve the operation simplicity. As can be seen from the suspension results in Table 3, regardless of the kind of fumed silica used, the fluids can all be formulated to have good solid suspensions.

TABLE 3

| | | Sample E | Sample F | Sample G | Sample H |
|---|---|---|---|---|---|
| Total fluid volume | mL | 100 | 100 | 100 | 100 |
| Proppant | g | 102 | 102 | 102 | 102 |
| Sand | g | 40.8 | 40.8 | 40.8 | 40.8 |
| $CaCO_3$ | g | 3 | 3 | 3 | 3 |
| Fumed Silica hydrophilic | g | 0 | 0.8 | 0 | 0 |
| Fumed Silica hydrophobic | g | 0 | 0 | 0.8 | 0 |
| Fumed Silica in Solution | g | 0 | 0 | 0 | 24.4 |
| Dispersant | g | 0.4 | 0.4 | 0.4 | 0.4 |
| Latex | g | 22.2 | 22.2 | 22.2 | 22.2 |
| Viscosifier | g | 0.9 | 0.9 | 0.9 | 0.9 |
| Antifoam | g | 0.43 | 0.43 | 0.43 | 0.2 |
| Tap water | g | 21.7 | 21.7 | 21.7 | 0 |
| After 24 h at room temperature | Top layer | Free fluid | No free fluid | No free fluid | No free fluid |
| | Main fluid | No settling | No settling | No settling | No settling |
| After 72 h at room temperature | Top layer | Free fluid | No free fluid | No free fluid | No free fluid |
| | Main fluid | Hard settling | No settling | No settling | No settling |

When the yield stress is provided only by calcium carbonate particles, the fluid is very sensitive to the dispersant concentration, a small excess of it can break totally the stability of the fluid and proppant quickly settles. Fluid based on fumed silica is less sensitive to the addition of dispersant. In the new formulation, dispersant sometimes is used to adjust the efficiency of the calcium carbonate as a leak-off control additive; it has been demonstrated that a better dispersion of $CaCO_3$ improves leak-off. Since the $CaCO_3$ in the prior art formulation is also the suspending agent, the excessive dispersion in fact impairs the solid suspension. By using fumed silica as the suspending agent, the risk is minimized. As shown in Table 4, dispersant has been doubled from the samples I to J and system remains stable. Table 4 below shows the dispersant effect of formulation according to some embodiments.

TABLE 4

| fluid | unit | Sample I | Sample J |
|---|---|---|---|
| Total fluid volume | mL | 100 | 100 |
| Proppant | g | 101.1 | 101.1 |
| $CaCO_3$ | g | 5.9 | 5.9 |
| Fumed Silica (Aerosil 200) | g | 0.8 | 0.8 |
| PLA particles | g | 17.8 | 17.8 |
| Surfactant | g | 0.3 | 0.3 |
| Dispersant | g | 0.44 | 0.9 |
| Latex | g | 22.2 | 22.1 |
| Viscosifier | g | 0.9 | 0.9 |
| Antifoam | g | 0.2 | 0.2 |
| Tap water | g | 21.8 | 21.6 |
| Free fluid after | | little | little |
| Settling after 24 h | | no | no |
| Plastic viscosity | cP | 580 | 471 |
| Yield Stress | Pa | 21 | 20 |
| Leak-off | g | 1.99 | 2.1 |

The foregoing disclosure and description of the invention is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:

1. A method of treating a subterranean formation of a well bore comprising:
   a. providing a pumpable treatment fluid comprising a particulate material, a viscosifying agent, a degradable material and fumed silica, each dispersed in an aqueous carrier fluid, wherein the particulate material has a first average particle size and the degradable material has a second average particle size, wherein the second average particle size is between three to twenty times smaller than the first average particle size, wherein the particulate material has further an amount of particulates having a third average particle size, wherein the third average particle size is between three to twenty times smaller than the second average particle size, such that the treatment fluid has a solid volume fraction from 50% to 70%; wherein the fumed silica is present in a concentration of less than about 2% by weight of the treatment fluid; wherein the treatment fluid has a plastic viscosity sufficient to allow pumping of the treatment fluid and a yield stress sufficient to prevent settling of the particulate from the carrier fluid over a period of at least a day; and
   b. introducing the treatment fluid into the wellbore.

2. The method of claim 1, wherein the particulate material comprises proppant having an average particle size from about 0.15 mm to about 4.76 mm, which is present in the treatment fluid in an amount up to about 1.92 kg/L (16 ppa), based on the volume of carrier fluid, and wherein the particulate material has a packing volume fraction above 0.70.

3. The method of claim 1, wherein the second average particle size is between five to ten times smaller than the first average particle size.

4. The method of claim 1, wherein the third average particle size is between five to ten times smaller than the second average particle size.

5. The method of claim 1, wherein the viscosifying agent is selected from the group consisting of substituted galactomannans, guar gums, high-molecular weight polysaccharides composed of mannose and galactose sugars, guar derivatives, hydroxypropyl guar (HPG), carboxymethylhydroxypropyl guar (CMHPG) and carboxymethyl guar (CMG), hydrophobically modified guars, guar-containing compounds, hydroxyethylcellulose (HEC), hydroxypropylcellulose (HPC), carboxymethylhydroxyethylcellulose (CMHEC), carboxymethycellulose (CMC), xanthan, diutan, scleroglucan and mixtures thereof.

6. The method of claim 1, wherein the viscosifying agent is viscoelastic surfactant.

7. The method of claim 1, wherein the fumed silica is present in a concentration of less than about 0.6% by weight of the treatment fluid.

8. The method of claim 1, wherein the fumed silica is in such concentration that one or more fluid properties of the treatment fluid are the same as fluid properties of an otherwise identical treatment fluid which does not include the fumed silica.

9. The method of claim 1, further comprising forming a particle pack within the wellbore having a reduced leakoff rate relative to a leakoff rate of the wellbore prior to well treatment, followed by a well cleanup comprising flowing back the fumed silica through the particle pack to a surface to clean up the formation.

10. The method of claim 9, wherein the treatment fluid further comprises a dispersant.

11. The method of claim 1, wherein the treatment fluid is not a cement slurry composition.

12. A method of treating a subterranean formation of a well bore, comprising:
providing an aqueous carrier fluid;
providing a particulate blend comprising a first amount of particulates having a first average particle size between about 100 and 2000 µm and a second amount of particulates having a second average particle size between about three and twenty times smaller than the first average particle size and a leak-off control agent;
combining the carrier fluid and the particulate blend to form an aqueous slurry;
stabilizing the aqueous slurry with a mixture of fumed silica particles, to form a pumpable aqueous treatment fluid having a solid volume fraction from 50% to 70% and comprising a solids mixture having a packed volume fraction (PVF) of at least 0.70;
introducing the aqueous treatment fluid into the wellbore; and
flowing back the fumed silica particles out of the wellbore to clean up the formation.

13. The method of claim 12, wherein the fumed silica particles are in a concentration of less than about 1% by weight of the aqueous treatment fluid.

14. The method of claim 12, wherein the fumed silica particles are in a concentration range of about 0.001% to about 0.5% by weight of the treatment fluid.

15. The method of claim 12, wherein the second amount of particulates comprises a degradable material.

16. The method of claim 12, wherein the second average particle size is between five to ten times smaller than the first average particle size.

17. The method of claim 12, wherein the first amount of particulates comprises proppant.

18. The method of claim 12, wherein the carrier fluid comprises a hydratable gelling agent at less than 2.4 g/L of carrier fluid.

19. The method of claim 12, wherein the carrier fluid comprises a viscoelastic surfactant at less than 1% by volume of the carrier fluid.

20. The method of claim 12, wherein the leak-off control agent comprises calcium carbonate particles.

21. The method of claim 20, wherein the calcium carbonate particles are present in the treatment fluid at less than 160 g/L based on the total volume of the treatment fluid.

22. The method of claim 12, wherein the carrier fluid further comprises a dispersant.

23. The method of claim 12, wherein the aqueous treatment fluid has a yield stress sufficient to prevent settling of the particulates from the carrier fluid over a period of at least a day.

24. The method of claim 12, wherein the aqueous treatment fluid is not a cement slurry composition.

25. A method of fracturing a subterranean formation of a well bore, comprising:
providing an aqueous carrier fluid comprising a hydratable gelling agent, a surfactant, and a dispersant, wherein the hydratable gelling agent is present at less than 2.4 g/L and the surfactant is present at less than 1 volume percent of the aqueous carrier fluid;
providing a particulate blend comprising a first amount of particulates comprising proppant having a first average particle size between about 100 and 2000 µm and a second amount of particulates having a second average particle size between about three and twenty times smaller than the first average particle size;
combining the aqueous carrier fluid, a leakoff agent, and the particulate blend in an aqueous slurry;
stabilizing the aqueous slurry with a mixture of fumed silica particles to form a pumpable aqueous treatment fluid having a solid volume fraction from 50% to 70%;
introducing the aqueous treatment fluid into the wellbore; and
initiating a fracture in the subterranean formation.

26. The method of claim 25, further comprising flowing back the fumed silica particles through the particulate blend to clean up the formation.

27. The method of claim 24, wherein the leak-off control agent comprises calcium carbonate particles.

28. The method of claim 25, wherein the aqueous treatment fluid has a yield stress sufficient to prevent settling of the particulates from the carrier fluid over a period of at least a day.

29. The method of claim 25, wherein the aqueous treatment fluid comprises a solids mixture having a packed volume fraction (PVF) of at least 0.70.

30. The method of claim 25, wherein the aqueous treatment fluid is not a cement slurry composition.

\* \* \* \* \*